(12) United States Patent
Murata

(10) Patent No.: US 8,977,840 B2
(45) Date of Patent: Mar. 10, 2015

(54) FAILOVER TO A STANDBY SYSTEM CALCULATOR IN THE LOSS OF COMMUNICATION BETWEEN CURRENTLY-USED SYSTEM CALCULATOR AND STANDBY SYSTEM CALCULATOR

(75) Inventor: Akihiro Murata, Tokyo (JP)

(73) Assignee: NEC Corporation, Tokyo (JP)

( * ) Notice: Subject to any disclaimer, the term of this patent is extended or adjusted under 35 U.S.C. 154(b) by 272 days.

(21) Appl. No.: 13/363,768

(22) Filed: Feb. 1, 2012

(65) Prior Publication Data

US 2012/0210117 A1 Aug. 16, 2012

(30) Foreign Application Priority Data

Feb. 10, 2011 (JP) ................................ 2011-027243

(51) Int. Cl.
*G06F 9/06* (2006.01)
*G06F 11/20* (2006.01)

(52) U.S. Cl.
CPC ........ *G06F 11/2028* (2013.01); *G06F 11/2023* (2013.01); *G06F 11/2038* (2013.01); *G06F 11/2048* (2013.01)
USPC ....................................................... 713/100

(58) Field of Classification Search
CPC ............ G06F 11/0757; G06F 11/2023; G06F 11/2028; G06F 11/2038; G06F 11/2048; G06F 11/2097
USPC ....................................................... 713/100
See application file for complete search history.

(56) References Cited

U.S. PATENT DOCUMENTS

| 6,163,856 | A | * | 12/2000 | Dion et al. ................... 714/4.11 |
| 8,407,182 | B1 | * | 3/2013 | Rajaa et al. ................... 707/610 |
| 2004/0034807 | A1 | * | 2/2004 | Rostowfske ...................... 714/4 |
| 2005/0005001 | A1 | | 1/2005 | Hara et al. |
| 2005/0257213 | A1 | * | 11/2005 | Chu et al. ...................... 717/170 |
| 2009/0201799 | A1 | * | 8/2009 | Lundstrom et al. ........... 370/217 |
| 2010/0191884 | A1 | | 7/2010 | Holenstein et al. |

(Continued)

FOREIGN PATENT DOCUMENTS

| JP | 63-286901 A | 11/1988 |
| JP | 2004-302512 A | 10/2004 |

(Continued)

OTHER PUBLICATIONS

European Search Report dated May 8, 2012.

(Continued)

*Primary Examiner* — Thomas Lee
*Assistant Examiner* — Danny Chan
(74) *Attorney, Agent, or Firm* — McGinn IP Law Group, PLLC

(57) ABSTRACT

A standby system calculator communicates with a currently-used system calculator for retaining data about a service, providing the service by using the data, and updating the data along with provision of the service. The standby system calculator includes a retainer that retains a copy of the data and a provider that provides the service by using the copy of the data while restricting an updating operation for updating the copy of the data in the retainer when a predetermined signal that indicates that the currently-used system calculator is operating and that has been transmitted from the currently-used system calculator to the standby system calculator, cannot be received for a predetermined period of time.

13 Claims, 7 Drawing Sheets

(56) References Cited

U.S. PATENT DOCUMENTS

2011/0161724 A1 6/2011 Matsugashita
2011/0173233 A1 7/2011 Matsumura et al.

FOREIGN PATENT DOCUMENTS

| JP | 2005-258947 A | 9/2005 |
| JP | 2006-146299 A | 6/2006 |
| JP | 2011-138225 A | 7/2011 |
| JP | 2011-145828 A | 7/2011 |
| WO | WO 2010-116456 A1 | 10/2010 |

OTHER PUBLICATIONS

Japanese Office Action dated Oct. 21, 2014 with an English Translation thereof.

* cited by examiner

FAILOVER TO A STANDBY SYSTEM CALCULATOR IN THE LOSS OF COMMUNICATION BETWEEN CURRENTLY-USED SYSTEM CALCULATOR AND STANDBY SYSTEM CALCULATOR

This application is based upon and claims the benefit of priority from Japanese patent application No. 2011-027243, filed on Feb. 10, 2011 the disclosure of which is incorporated herein in its entirety by reference.

BACKGROUND OF THE INVENTION

1. Field of the Invention

The present invention relates to a standby system calculator, a cluster system, and a method of providing a service, and recording medium for taking over a service being executed by a currently-used system calculator when failure occurs in the currently-used system calculator.

2. Description of the Related Art

In order to shorten the time during which a service provided by a system is stopped, a cluster system including a plurality of calculators capable of providing the same service is known.

In the cluster system, when failure occurs in a currently-used system calculator that executes an application program and that provides a service, a standby system calculator takes over the service by taking over execution of the application program. The period of time during which the service is stopped can be shortened by the take-over (failover) of the service.

When a heartbeat (heartbeat packet), which is output from the currently-used system calculator, is disrupted, the standby system calculator judges whether or not failure has occurred in the currently-used system calculator. Specifically, the standby system calculator judges whether the cause of the disruption of the heartbeat is communication failure (network partition) or failure in the currently-used system calculator. In order to judge whether the cause of the disruption of the heartbeat is communication failure or failure in the currently-used system calculator, a plurality of physically-independent communication lines between the calculators constituting the cluster system is required.

If the standby system calculator erroneously judges the cause of the disruption of the heartbeat as failure in the currently-used system calculator even when the cause of the disruption of the heartbeat is communication failure, both the currently-used system calculator and the standby system calculator will provide services.

In this case, the state (split brain), in which the consistency between the data owned by the currently-used system calculator (data updated based on execution of the service) and the data owned by the standby system calculator (data updated based on execution of the service) is not achieved, is generated.

Patent Literature 1 (JP2006-146299) describes a split brain recovery method of executing a recovery process for solving the inconsistency of the data of each of a plurality of calculators when the disruption of the heartbeat is solved after occurrence of the split brain state.

In Patent Literature 1, a technique of solving the inconsistency of the data caused by the split brain is described, however, a technique for suppressing occurrence of the split brain state is not described.

As a method of suppressing occurrence of the split brain state, a method of providing a plurality of physically-independent communication lines between the calculators constituting the cluster system and highly accurately judging whether the cause of the disruption of the heartbeat is communication failure or failure in the currently-used system calculator is conceivable.

However, this method has a problem in which the plurality of physically-independent communication lines between the calculators constituting the cluster system is required to suppress the occurrence of the split brain state. This problem is particularly notable when the standby system calculator is installed at a location remote from the installation location of the currently-used system calculator as a countermeasure against disasters.

As another method of suppressing the occurrence of the split brain state, a method in which an operator confirms that the currently-used system calculator has stopped and then provides instructions, by a manual operation, to the standby system to initiate failover, is also conceivable.

However, this method has a problem in which the service is stopped from when the currently-used system calculator stops operating and until the operator instructs the failover.

SUMMARY OF THE INVENTION

It is an object of the present invention to provide a standby system calculator, a cluster system, a method of providing a service, and recording medium capable of solving the above described problems.

A standby system calculator, according to an exemplary aspect of the invention, which communicates with a currently-used system calculator for retaining data about a service, the currently-used system calculator providing the service by using the data, and the currently-used system calculator for updating the data along with provision of the service, includes:

a retention unit that retains a copy of the data; and a provision unit that provides the service by using the copy of the data while restricting an updating operation for updating the copy of the data in the retention unit when the provision unit does not receive a predetermined signal transmitted from the currently-used system calculator to the standby system calculator for a predetermined period of time, the predetermined signal indicating that the currently-used system calculator is operating.

A method of providing a service, according to an exemplary aspect of the invention, in a standby system calculator that communicates with a currently-used system calculator for retaining data about a service, the currently-used system calculator providing the service by using the data, and the currently-used system calculator updating the data along with provision of the service, includes:

retaining a copy of the data in a retention unit; and providing the service by using the copy of the data while restricting an updating operation for updating the copy of the data in the retention unit when the standby system calculator does not receive a predetermined signal transmitted from the currently-used system calculator to the standby system calculator for a predetermined period of time, the predetermined signal indicating that the currently-used system calculator is operating.

A computer readable recording medium, according to an exemplary aspect of the invention, has thereon a program for causing a computer, which communicates with a currently-used system calculator for retaining data about a service, the currently-used system calculator providing the service by using the data, and the currently-used system calculator updating the data along with provision of the service, to execute:

a retention procedure for retaining a copy of the data in a retention unit; and a provision procedure for providing the service by using the copy of the data while restricting an updating operation for updating the copy of the data in the retention unit when the computer does not receive a predetermined signal transmitted from the currently-used system calculator to the standby system calculator for a predetermined period of time, the predetermined signal indicating that the currently-used system calculator is operating.

The above and other objects, features, and advantages of the present invention will become apparent from the following description with reference to the accompanying drawings which illustrate an example of the present invention.

DETAILED DESCRIPTION OF THE EXEMPLARY EMBODIMENT

Figure 1:
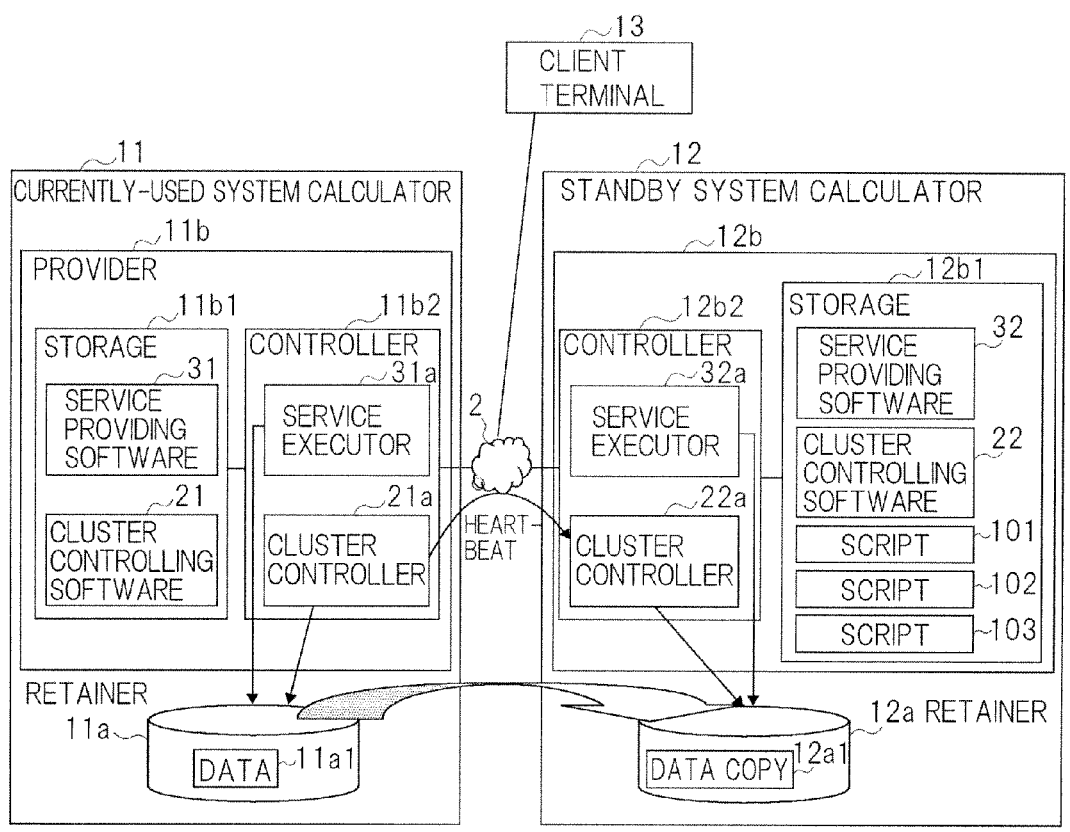
FIG. 1 is a block diagram showing cluster system 1 of an exemplary embodiment.

Hereinafter, an exemplary embodiment will be explained with reference to drawings. FIG. 1 is a block diagram showing cluster system 1 of the exemplary embodiment.

In FIG. 1, cluster system 1 includes currently-used system calculator 11 and standby system calculator 12. Currently-used system calculator 11 and standby system calculator 12 can communicate with each other via network 2. Currently-used system calculator 11 and standby system calculator 12 can be connected with client terminal 13 via network 2. Standby system calculator 12 is installed, for example, at a location remote from the installation location of currently-used system calculator 11.

Currently-used system calculator 11 includes retainer 11a, which retains data 11a1 about service S determined in advance, and provider 11b. Provider 11b includes storage 11b1 and controller 11b2. Controller 11b2 includes cluster controller 21a and service executor 31a. Standby system calculator 12 includes retainer 12a, which retains copy 12a1 of data 11a1, and provider 12b. Provider 12b includes storage 12b1 and controller 12b2. Controller 12b2 includes cluster controller 22a and service executor 32a.

First, currently-used system calculator 11 will be explained.

Retainer 11a is, for example, a hard disk, which is a recording medium readable by a computer. The recording medium is not limited to the hard disk, but can be arbitrarily changed.

Data 11a1 in the retainer 11a is, for example, customer data (names, ages of customers) of service S. If service S is a service for managing stocks of commercial products, data 11a1 is stock data showing the stocks of the commercial products. Data 11a1 is not limited to the customer data or stock data, but can be arbitrarily changed.

Provider 11b provides service S by using data 11a1 in retainer 11a.

Storage 11b1 is a recording medium readable by a computer and stores cluster controlling software (cluster controlling program) 21 and service providing software (service providing program) 31. Storage 11b1 may be provided in retainer 11a.

Controller 11b2 is, for example, a CPU (Central Processing Unit), which is an example of a computer.

Controller 11b2 reads cluster controlling software 21 from storage 11b1 and executes the software to function as cluster controller 21a. Cluster controller 21a is resident. Controller 11b2 reads service providing software 31 from storage 11b1 and executes the software to function as service executor 31a. When service S is not provided, controller 11b2 does not execute service providing software 31 and does not function as service executor 31a.

Service executor 31a provides service S to client terminal 13 by using data 11a1 in retainer 11a. Service executor 31a updates data 11a1 in some cases along with provision of service S. For example, if service S is a stock managing service, data 11a1 is updated in accordance with variation in stocks.

Cluster controller 21a periodically (for example, at an interval of 10 seconds) transmits a heartbeat packet to standby system calculator 12. The heartbeat packet is an example of a predetermined signal indicating that currently-used system calculator 11 is operating. The transmission interval of the heartbeat packet is not limited to 10 seconds, but can be arbitrarily changed.

Cluster controller 21a hooks a process for updating data 11a1 by service executor 31a and subjects copy 12a1 of the data in retainer 12a to updating (mirroring) similar to that of data 11a1. Cluster controller 21a periodically copies data 11a1 to retainer 12a. Periodically, cluster controller 21a additionally writes the update differential between data 11a1 and data copy 12a1 to retainer 12a. Therefore, copy 12a1 of data 11a1 is retained in retainer 12a.

Next, standby system calculator 12 will be explained.

Retainer 12a can be generally referred to as retention means.

Retainer 12a is, for example, a hard disk. Retainer 12a retains copy 12a1 of data 11a1 retained by retainer 11a in currently-used system calculator 11.

Provider 12b can be generally referred to as provision means.

When the heartbeat packet transmitted from currently-used system calculator 11 to standby system calculator 12 cannot be received by provider 12b for a predetermined period of time (for example, 90 seconds), provider 12b provides service S by using data copy 12a1 while restricting an updating operation for updating data copy 12a1 in retainer 12a. The predetermined period of time is not limited to 90 seconds, but can be arbitrarily changed in accordance with, for example, the interval of transmitting the heartbeat packet and the performance of the calculators and network 2.

Storage 12b1 is a computer readable recording medium and stores cluster controlling software (cluster controlling program) 22, service providing software (service providing program) 32, script 101, script 102, and script 103. Service providing software 32 specifies a procedure which is the same as a procedure specified by service providing software 31. Storage 12b1 may be provided in retainer 12a.

Controller 12b2 is, for example, a CPU (Central Processing Unit).

Controller 12b2 reads cluster controlling software 22 from storage 12b1 and executes the software to function as cluster controller 22a. Cluster controller 22a is resident.

Controller 12b2 reads service providing software 32 from storage 12b1 and executes the software to function as service executor 32a. When service S is not provided, controller 12b2 does not execute service providing software 32 and does not function as service executor 32a.

Cluster controller 22a receives the heartbeat packet periodically transmitted from cluster controller 21a, thereby monitoring activeness/inactiveness of currently-used system calculator 11.

In the exemplary embodiment, cluster controller 22a monitors whether the heartbeat packet transmitted from currently-used system calculator 11 to standby system calculator 12 cannot be received for a predetermined period of time (for example, 90 seconds) or not.

If the heartbeat packet from cluster controller 21a cannot be received by cluster controller 22a for the predetermined period of time due to an operation stop of currently-used system calculator 11 or failure on a communication path (for example, network 2) between currently-used system calculator 11 and standby system calculator 12, cluster controller 22a reads and executes script 101, which is in storage 12b1.

Script 101 is a program for causing cluster controller 22a to execute an instruction in which service executor 32a carries out a process for starting service S with a function restriction (hereinafter, referred to as "first process") by using data copy 12a1 in retainer 12a.

In the exemplary embodiment, in the first process, service S is provided by using data copy 12a1 while restricting the updating operation for updating data copy 12a1 in retainer 12a. For example, in the first process, service S is started while data copy 12a1 is not updated (reference only) in standby system calculator 12 or the updatable part is limited to a predetermined part (for example, a range that does not affect service S even when the update is returned to the original state) of data copy 12a1.

Cluster controller 22a executes script 101, thereby activating service executor 32a and causing service executor 32a to execute the first process.

In the case in which: currently-used system calculator 11 is not stopped, failure on the communication path is recovered, and the heartbeat packet from cluster controller 21a is received by cluster controller 22a again, cluster controller 22a then reads and executes script 102, which is in storage 12b1.

Script 102 is program for causing cluster controller 22a to execute a process (hereinafter, referred to as "second process") for stopping operation of service executor 32a and copying data 11a1, which is in currently-used system calculator 11, to retainer 12a to update data copy 12a1, which is in retainer 12a.

Cluster controller 22a executes the second process by executing script 102. When the second process is executed, service executor 32a stops operating, and data copy 12a1 becomes the newest copy.

When an operator confirms that currently-used system calculator 11 is stopped and carries out an operation for cancelling the function restriction of the service with respect to standby system calculator 12, an instruction to cancel the restriction on the updating operation is received by cluster controller 22a.

When the instruction to cancel the restriction on the updating operation is received by cluster controller 22a, cluster controller 22a reads and executes script 103, which is in storage 12b1.

Script 103 is a program for causing cluster controller 22a to execute an instruction in which service executor 32a carries out a process (hereinafter, referred to as "third process") for cancelling the restriction on the updating operation and for providing service S by using data copy 12a1.

Cluster controller 22a causes service executor 32a to execute the third process by executing script 103. Thereafter, data copy 12a1 in standby system calculator 12 serves as a master (copy source).

Next, an outline of the operation of cluster system 1 will be explained.

Currently-used system calculator 11 provides service S in a normal state.

In standby system calculator 12, cluster controller 22a receives the heartbeat packet periodically transmitted from cluster controller 21a, which is in currently-used system calculator 11, thereby confirming activeness of currently-used system calculator 11.

Figure 2:
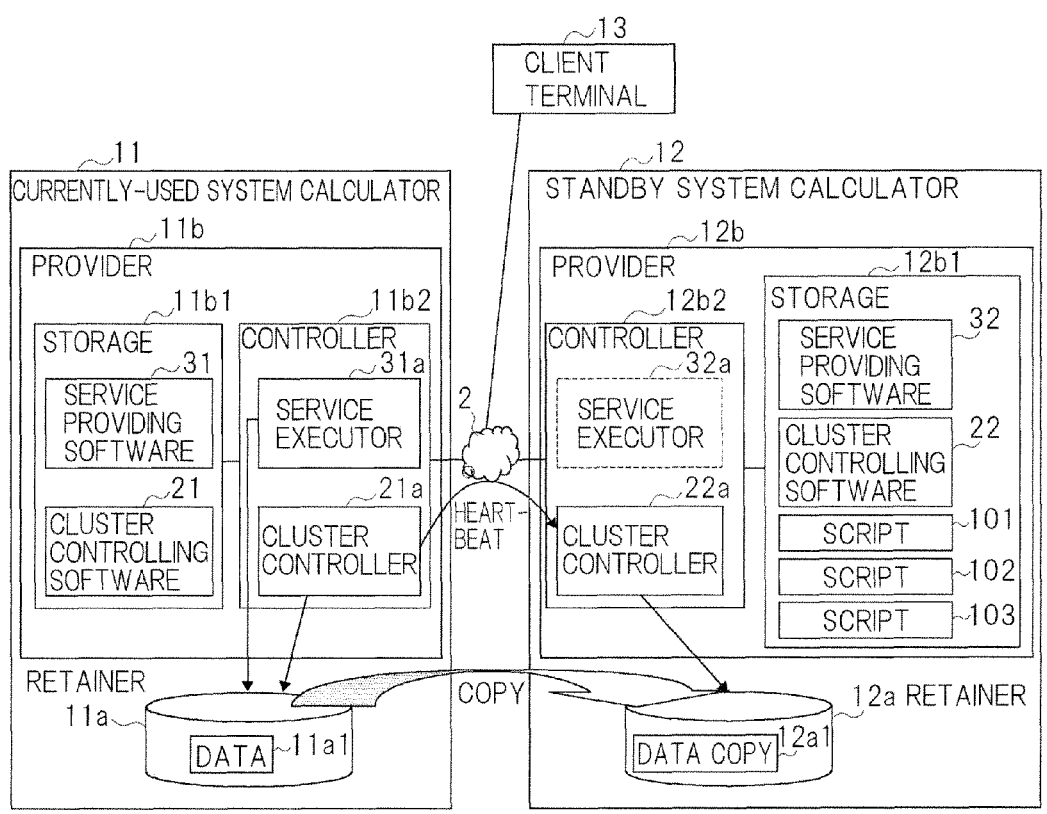
FIG. 2 is a block diagram showing cluster system 1 when currently-used system calculator 11 is in a normal state.

FIG. 2 is a block diagram showing cluster system 1 when currently-used system calculator 11 is in the normal state. In FIG. 2, the members having the same configurations as those shown in FIG. 1 are denoted by the same reference numerals.

When currently-used system calculator 11 is in the normal state, data 11a1 referenced/updated by service executor 31a in currently-used system calculator 11 is copied to retainer 12a in standby system calculator 12 by cluster controller 21a and cluster controller 22a.

Figure 3:
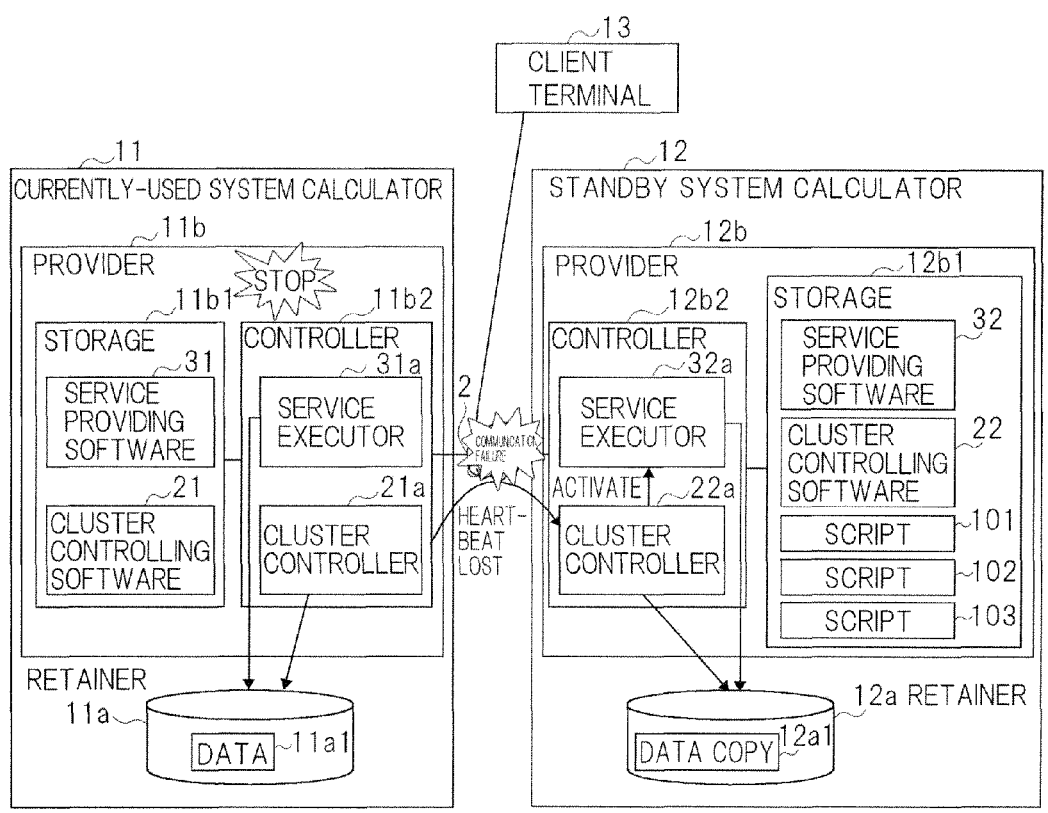
FIG. 3 is a block diagram showing cluster system 1 in the case in which the heartbeat packet from currently-used system calculator 11 is disrupted.

FIG. 3 is a block diagram showing cluster system 1 in the case in which the heartbeat packet from currently-used system calculator 11 is disrupted. In FIG. 3, the members having the same configurations as those shown in FIG. 1 are denoted by the same reference numerals.

When the heartbeat packet from currently-used system calculator 11 is disrupted, wherein activation of currently-used system calculator 11 cannot be confirmed, cluster controller 22a activates service executor 32a by standby system calculator 12.

Service executor 32a can be in: a stopped state, the state in which a data update in standby system calculator 12 is restricted, and the state in which a data update in standby system calculator 12 is not restricted.

Cluster controller 22a executes script 101, 102, or 103 describing the process for carrying out transition between these states, thereby controlling the state transition of service executor 32a.

Figure 4:
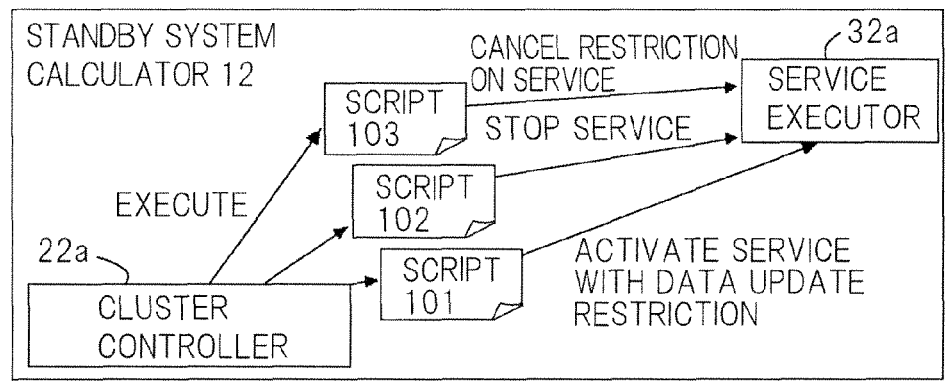
FIG. 4 is a drawing for explaining the controlling state of service S using scripts 101, 102, and 103.
Figure 5:
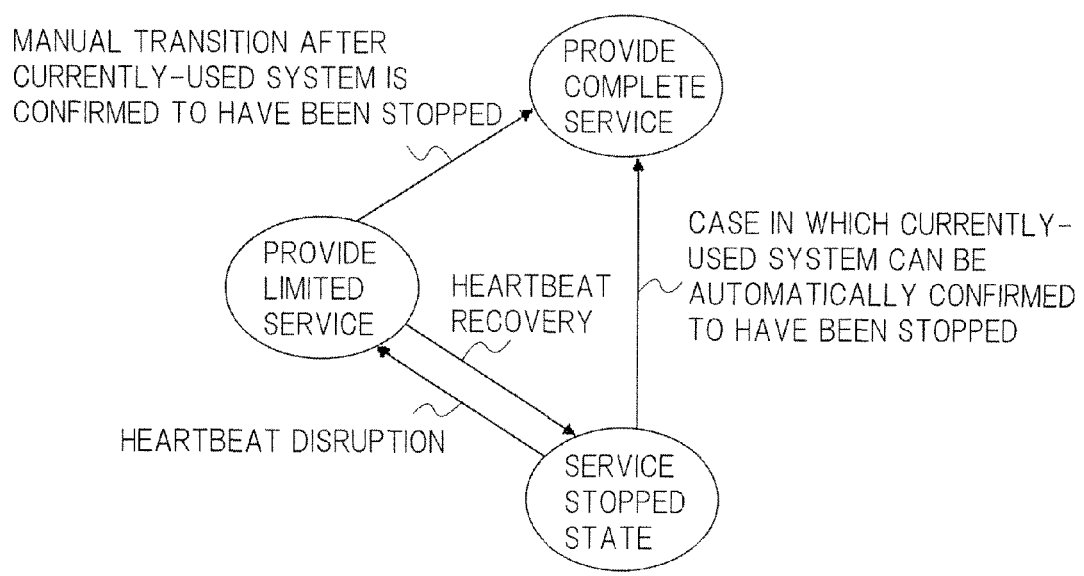
FIG. 5 is a drawing showing the state transition of service executor 32a in standby system calculator 12.

FIG. 4 is a drawing for explaining the controlling state of service S using scripts 101, 102, and 103. FIG. 5 is a drawing showing the state transition of service executor 32a in standby system calculator 12.

Script 101 causes service executor 32a in the stopped state to undergo a transition to the active state with the data update restriction, script 102 causes service executor 32a in the state activated with the data update restriction to undergo a transition to the stopped state, and script 103 causes service executor 32a in the activated state with the data update restriction to undergo the state without the restriction on data update.

Next, operation of cluster system 1 will be explained.

Figure 6:
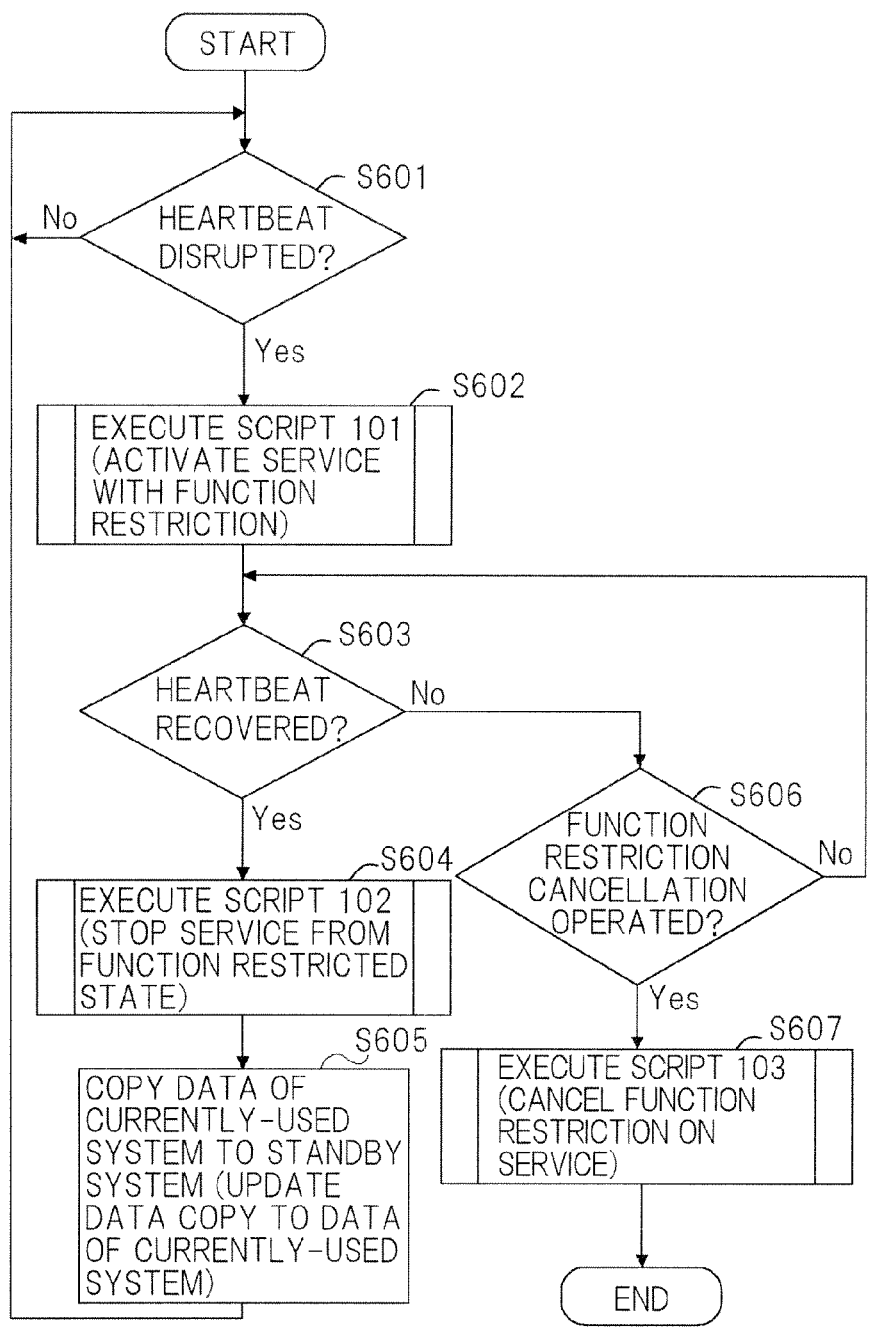
FIG. 6 is a flow chart for explaining the operation of cluster system 1.

FIG. 6 is a flow chart for explaining the operation of cluster system 1.

Cluster controller 22a in standby system calculator 12 judges whether or not the heartbeat packet from currently-used system calculator 11 has been disrupted (step S601).

When the heartbeat packet from currently-used system calculator 11 is disrupted, cluster controller 22a executes script 101 (step S602). Along with execution of script 101, service executor 32a starts service S in the state in which update of data copy 12a1 in standby system calculator 12 is restricted, wherein, for example, data copy 12a1 is not updated (reference only), or updatable part of data copy 12a1 is restricted to the range that does not cause problems even when the update is returned to the original state.

Then, cluster controller 22a judges whether or not reception of the heartbeat packet has been recovered or not (step S603).

When reception of the heartbeat packet is recovered, it is considered that currently-used system calculator 11 has not been stopped and that the heartbeat packet has been disrupted due to communication failure; therefore, cluster controller 22a executes script 102 (step S604).

Along with execution of script 102, cluster controller 22a stops operation of service executor 32a. Furthermore, cluster controller 22a copies data 11a1 in currently-used system calculator 11 to retainer 12a in standby system calculator 12 to match the data of both systems again (S605).

When data 11a1 in currently-used system calculator 11 is copied to retainer 12a in standby system calculator 12, cluster controller 22a returns to step S601 and resumes currently-used system activeness/inactiveness monitoring based on reception of the heartbeat packet.

On the other hand, if the heartbeat is not recovered in step S603, cluster controller 22a judges whether the operator has carried out an operation to cancel the function restriction (step S606).

When the operator carries out an operation to cancel the function restriction, cluster controller 22a executes script 103 (step S607). Along with execution of script 103, cluster controller 22a cancels the function restriction on the service and changes the state of service executor 32a to the state in which service S similar to that of currently-used system calculator 11 is provided.

On the other hand, when the operator does not carry out an operation to cancel the function restriction in step S606, cluster controller 22a returns to step S603.

Next, effects of the exemplary embodiment will be explained.

In the exemplary embodiment, at the point when disruption of the heartbeat (heartbeat packet) is confirmed, the function of service executor 32a is restricted to the range that does not cause problems even if the disruption is due to communication failure, and the service is automatically activated by standby system calculator 12. Therefore, the time during which the service is completely stopped can be shortened.

Also, at the point when the communication failure is recovered, the service provision by standby system calculator 12 can be automatically stopped to return the state of cluster system 1 to the normal state.

When the scripts are used in control of the service, the system can be utilized for general purposes as a cluster foundation function independent from implementation of the service.

According to the exemplary embodiment, retainer 12a retains copy 12a1 of data 11a1 owned by currently-used system calculator 11. When the heartbeat packet transmitted from currently-used system calculator 11 to standby system calculator 12 cannot be received for a predetermined period of time, provider 12b provides service S by using data copy 12a1 while restricting the updating operation for updating data copy 12a1 in retainer 12a.

Since provider 12b restricts the updating operation for updating data copy 12a1 in retainer 12a, occurrence of the split brain state can be suppressed without the need of a plurality of physically independent communication lines between the calculators constituting the cluster system. If the heartbeat packet cannot be received for a predetermined period of time, provider 12b provides service S but service S is provided with the restriction. Therefore, the time during which service S is completely stopped can be shortened.

In the exemplary embodiment, when the heartbeat packet cannot be received for the predetermined period of time, provider 12b provides the service by using data copy 12a1 while prohibiting updating of data copy 12a1 in retainer 12a. In this case, occurrence of the split brain state can be prohibited.

In the exemplary embodiment, when the instruction to cancel the restriction on the updating operation is received after providing the service, provider 12b cancels the restriction on the updating operation and provides the service by using the copy of data 12a1.

In this case, the restriction on the updating operation can be cancelled.

In the exemplary embodiment, when the heartbeat packet is received after providing the service, provider 12b copies data 11a1 in currently-used system calculator 11 to retainer 12a to update the data copy in retainer 12a.

In this case, along with recovery of communication failure (network partition), cluster system 1 can be automatically returned to the normal state.

Figure 7:
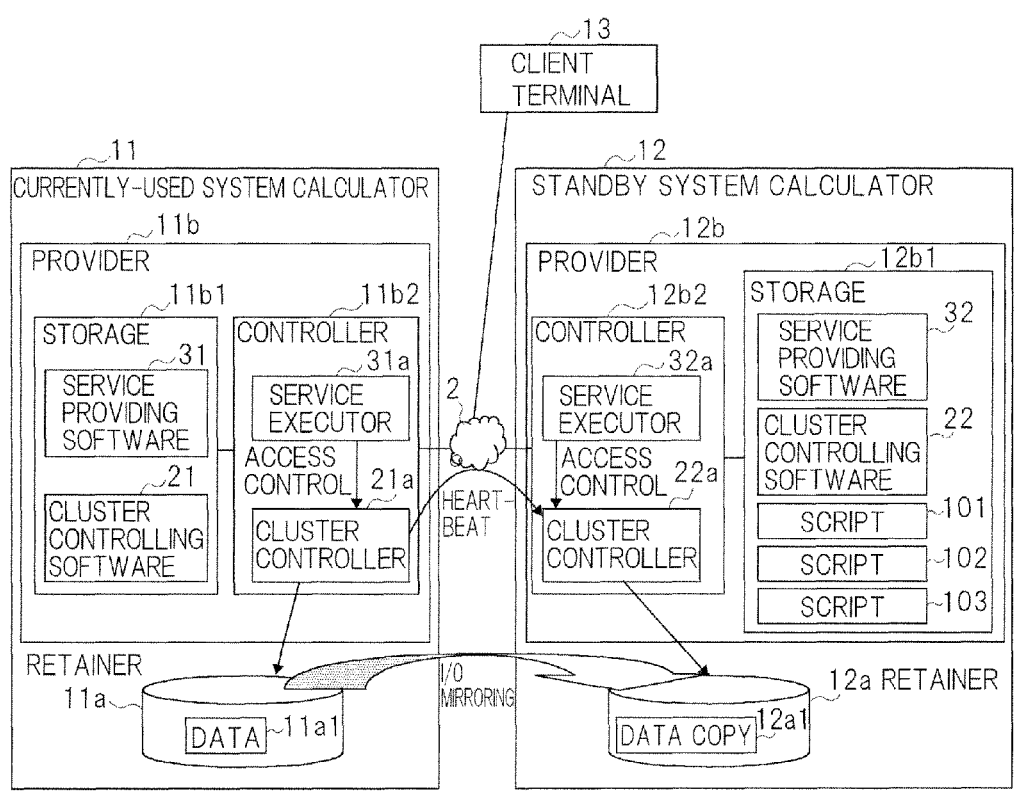
FIG. 7 is a block diagram showing a modification example of cluster system 1.

In the above described exemplary embodiment, as shown in FIG. 7, in the activation/stop control of service executor 32a, cluster controller 22a may control the access with respect to the data copy from service executor 32a to permit service executor 32a to only reference data copy 12a1 and to permit the updating of data by manual operation of the operator without restricting the function for updating data.

In the exemplary embodiment explained above, illustrated configurations are merely examples, and the present invention is not limited to the configurations.

An example of the effects of the present invention is that the period of time during which the service is completely stopped can be shortened while suppressing the occurrence of a split brain state without the need of a plurality of physically-independent communication lines between the calculators constituting the cluster system.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims

What is claimed is:

1. A standby system calculator that communicates with a currently-used system calculator for retaining data about a service, said currently-used system calculator providing the service by using the data, and said currently-used system calculator updating the data along with a provision of the service, the standby system calculator comprising:
a retention unit that retains a copy of the data; and
a provision unit that provides the service by using the copy of the data while restricting an updating operation for updating the copy of the data in said retention unit when the provision unit does not receive a predetermined signal transmitted from the currently-used system calculator to the standby system calculator for a predetermined period of time, said predetermined signal indicating that the currently-used system calculator is operating,
wherein when said provision unit receives an instruction to cancel the restriction on the updating operation after providing the service, said provision unit cancels the restriction on the updating operation and provides the service by using the copy of the data, and wherein said instruction is received after a failover is carried out.

2. The standby system calculator according to claim 1, wherein,
when said provision unit does not receive the predetermined signal for the predetermined period of time, said provision unit provides the service by using the copy of the data while prohibiting the updating operation.

3. The standby system calculator according to claim 1, wherein,
when said provision unit receives the predetermined signal after providing the service, said provision unit copies the data in the currently-used system calculator to said retention unit in order to update the copy of the data in said retention unit.

4. A cluster system comprising the standby system calculator and the currently-used system calculator according to claim 1.

5. The standby system calculator according to claim 1, wherein said provision unit comprises a cluster controller which monitors an activity state of said currently-used system calculator.

6. The standby system calculator according to claim 1, wherein said provision unit comprises a cluster controller which determines whether a heartbeat packet from said currently-used system calculator has been disrupted.

7. The standby system calculator according to claim 1, wherein said predetermined signal comprises a heartbeat packet.

8. The standby system calculator according to claim 1, wherein said provision unit provides the service by using the copy of the data while restricting an updating operation for updating the copy of the data in said retention unit when said failover occurs.

9. The standby system calculator according to claim 1, wherein said restricting comprises prohibiting.

10. The standby system calculator according to claim 1, wherein said provision unit provides said service by using the copy of the data while prohibiting said updating operation for updating the copy of the data when said failover occurs.

11. A method of providing a service in a standby system calculator that communicates with a currently-used system calculator for retaining data about a service, said currently-used system calculator providing the service by using the data, and said currently-used system calculator updating the data along with a provision of the service, the method comprising:

retaining a copy of the data in a retention unit;

providing the service by using the copy of the data while restricting an updating operation for updating the copy of the data in said retention unit when the standby system calculator does not receive a predetermined signal transmitted from the currently-used system calculator to the standby system calculator for a predetermined period of time, said predetermined signal indicating that the currently-used system calculator is operating; and when receiving an instruction to cancel the restriction on the updating operation after providing the service, canceling the restriction on the updating operation and providing the service by using the copy of the data, and wherein said instruction is received after a failover is carried out.

12. The method according to claim 11, wherein said service is provided by using the copy of the data while prohibiting said updating operation for updating the copy of the data when said failover occurs.

13. A non-transitory computer readable recording medium having thereon a program for causing a computer, which communicates with a currently-used system calculator for retaining data about a service, said currently-used system calculator providing the service by using the data, and said currently-used system calculator updating the data along with provision of the service, to execute:

a retention procedure for retaining a copy of the data in a retention unit; and a provision procedure for providing the service by using the copy of the data while restricting an updating operation for updating the copy of the data in said retention unit when said computer does not receive a predetermined signal transmitted from the currently-used system calculator for a predetermined period of time, said predetermined signal indicating that the currently-used system calculator is operating, wherein in said provision procedure, when receiving an instruction to cancel the restriction on the updating operation after providing the service, canceling the restriction on the updating operation and providing the service by using the copy of the data, and wherein said instruction is received after a failover is carried out.

* * * * *